(12) United States Patent
McBeath et al.

(10) Patent No.: US 8,340,046 B2
(45) Date of Patent: Dec. 25, 2012

(54) METHOD AND APPARATUS FOR ASSOCIATING A PACKET WITH AN H-ARQ CHANNEL IDENTIFIER

(75) Inventors: Sean Michael McBeath, Keller, TX (US); Anthony C. K. Soong, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 15 days.

(21) Appl. No.: 13/277,983

(22) Filed: Oct. 20, 2011

(65) Prior Publication Data

US 2012/0033637 A1  Feb. 9, 2012

Related U.S. Application Data

(63) Continuation of application No. 12/197,074, filed on Aug. 22, 2008.

(60) Provisional application No. 60/972,454, filed on Sep. 14, 2007.

(51) Int. Cl.
*H04W 4/00* (2009.01)
(52) U.S. Cl. ........................................................ 370/330
(58) Field of Classification Search .................. 370/330
See application file for complete search history.

(56) References Cited

U.S. PATENT DOCUMENTS

| 7,376,076 | B2 | 5/2008 | You et al. | |
|---|---|---|---|---|
| 2008/0025247 | A1* | 1/2008 | McBeath et al. | 370/321 |
| 2008/0062944 | A1* | 3/2008 | Smith et al. | 370/342 |
| 2008/0187136 | A1* | 8/2008 | Zhang et al. | 380/270 |
| 2009/0022098 | A1* | 1/2009 | Novak et al. | 370/329 |

FOREIGN PATENT DOCUMENTS

| CN | 1463098 A | 12/2003 |
|---|---|---|
| WO | 2006047851 A1 | 5/2006 |
| WO | 2007027052 A1 | 3/2007 |
| WO | 2007045101 A2 | 4/2007 |

OTHER PUBLICATIONS

International Search Report and Written Opinion of the International Search Authority for International application No. PCT/CN2008/072301, dated Dec. 18, 2008, total 12 pages.
US office action for U.S. Appl. No. 12/197,074, dated Oct. 26, 2011, total 10 pages.
IEEE Standard for Local and metropolitan area networks,"Part 16: Air Interface for Fixed and Mobile Broadband Wireless Access Systems," IEEE Std 802.16e, dated Dec. 7, 2005, total 864 pages.

* cited by examiner

*Primary Examiner* — Derrick Ferris
*Assistant Examiner* — Noel Beharry (57) ABSTRACT

Method and apparatus are provided for transmitting control information to a mobile station. A persistent assignment is transmitted to a mobile station, wherein the persistent assignment includes a plurality of hybrid automatic repeat request (H-ARQ) channel identifiers (ACIDs). A subsequent assignment including an ACID derived from the plurality of ACIDs is transmitted to the mobile station. In another aspect of the invention, a mobile station receives from a base station a persistent assignment including a plurality of ACIDs, and a subsequent assignment including an ACID derived from the plurality of ACIDs.

12 Claims, 14 Drawing Sheets

| Parameter Name | Number of Bits |
|---|---|
| Connection Identifier | 16 |
| Subchannel Offset | 8 |
| Symbol Offset | 8 |
| Number of Subchannels | 8 |
| Number of Symbols | 8 |
| Modulation/Coding | 4 |
| ACID | 4 |
| SPID | 2 |

| Parameter Name | Number of Bits |
|---|---|
| Connection Identifier | 16 |
| Persistent | 1 |
| Start ACID | 4 |
| Number of ACID | 2 |
| Subchannel Offset | 8 |
| Symbol Offset | 8 |
| Number of Subchannels | 8 |
| Number of Symbols | 8 |
| Modulation/Coding | 4 |

METHOD AND APPARATUS FOR ASSOCIATING A PACKET WITH AN H-ARQ CHANNEL IDENTIFIER

CROSS-REFERENCE TO RELATED APPLICATIONS

The present application is a continuation of U.S. patent application Ser. No. 12/197,074, filed Aug. 22, 2008, "Method and Apparatus for Associating a Packet with an H-ARQ Channel Identifier," which claims the benefit of U.S. Provisional Application Ser. No. 60/972,454, filed Sep. 14, 2007, and entitled "Method and Apparatus for Associating a Packet with an H-ARQ Channel Identifier," both of which are hereby incorporated herein by reference.

TECHNICAL FIELD

The present invention relates generally to the transmission of hybrid automatic repeat request (H-ARQ) channel identifier (ACID) information in a wireless communication system. Specifically, the present invention relates to a novel method of transmitting ACID information in orthogonal frequency division multiplexing (OFDM) and orthogonal frequency division multiple access (OFDMA) communication systems.

BACKGROUND

In an OFDMA communication system, the time-frequency resources of the system are shared among a plurality of mobile stations. The base station assigns resources to mobile stations using an assignment message, which is transmitted as part of a control channel. To minimize control channel overhead, it is known for the base station to make persistent assignments, wherein the assignment message is transmitted to the mobile station initially to indicate the assigned time-frequency resource, and then the base station uses the same time-frequency resource for subsequent transmissions to (or receptions from) the mobile station.

These transmissions can be for H-ARQ transmissions of the same packet, for subsequent transmissions of different packets, or for initial transmissions of a series of packets. For example, in a voice over internet protocol (VoIP) system, the base station may make a persistent resource assignment to a particular mobile station consisting of a particular time-frequency resource with a period equal to 20 msec (the vocoder period). Then, the base station can use this resource for the first H-ARQ transmission of each VoIP packet. Subsequent transmissions, if necessary, must be signaled.

The initially assigned time-frequency resource is maintained by the base station for the mobile station until a timer elapses, a voice over internet protocol (VoIP) talk-spurt is completed, a VoIP call is completed, a certain number of negative acknowledgements is determined by the base station, or until the resource is explicitly or implicitly de-assigned by the base station.

In some systems, the base station and mobile station can maintain multiple decoding buffers corresponding to multiple ACIDs corresponding to multiple packets. For example, the base station can transmit H-ARQ transmission 1 of packet 1, followed by H-ARQ transmission 1 of packet 2, followed by H-ARQ transmission 2 of either packet 1 or packet 2. The base station and mobile station typically keep track of which packet is currently being transmitted by associating each packet with a particular ACID and including the ACID in the control channel corresponding to the packet. For persistent assignments corresponding to the transmission of multiple packets, there is not currently a method for establishing an association between the series of packets and a series of ACID values. Thus, there is a need for an efficient method for associating a series of packets signaled in a persistent assignment to a series of ACID values.

SUMMARY OF THE INVENTION

These and other problems are generally solved or circumvented, and technical advantages are generally achieved, by preferred embodiments of the present invention In one aspect of the invention, a mobile station is configured to transmit a persistent assignment to the mobile station using a control channel. The persistent assignment includes an indication of a time-frequency resource assignment for the mobile station and is associated with a plurality of hybrid automatic repeat request (H-ARQ) channel identifiers (ACIDs). The resource assignment repeats at a first periodic interval, and each of the plurality of ACIDs repeats at a second periodic interval Another aspect of the invention provides for transmission of a packet between a base station and a mobile station. A control channel is established between the base station and the mobile station, and a persistent assignment is transmitted to the mobile station using the control channel. The persistent assignment includes an indication of a time-frequency resource assignment and is associated with a plurality of hybrid automatic repeat request (H-ARQ) channel identifiers. The resource assignment repeats at a first periodic interval, and each of the plurality of ACIDs repeats at a second periodic interval.

In another aspect of the invention, a mobile station is configured to receive a persistent assignment from the base station. The persistent assignment includes an indication of a first time-frequency resource assignment and is associated with a plurality of hybrid automatic repeat request (H-ARQ) channel identifiers (ACIDs). A packet associated with H-ARQ channel identifier determined from the associated plurality of H-ARQ channel identifiers is transmitted to the base station using the first assigned time-frequency resource.

In yet another aspect, embodiments of the invention provide a method in a mobile station for receiving a packet from a base station. The method includes receiving from a base station a persistent assignment including an indication of a time-frequency resource assignment, the persistent assignment being associated with a plurality of H-ARQ channel identifiers. The method further includes receiving a packet from the base station using the time-frequency resource, the packet being associated with an H-ARQ channel identifier determined from the associated plurality of H-ARQ channel identifiers, and processing the received packet.

An advantageous feature of preferred embodiments of the invention is the ability to provide ACIDs associated with a persistent assignment of time-frequency resources.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described in the context of a method and apparatus for associating a packet with an H-ARQ channel identifier. It is understood, however, that the following disclosure provides many different embodiments, or examples, for implementing different features of the invention. Specific examples of components, signals, messages, protocols, and arrangements are described below to simplify the present disclosure. These are, of course, merely examples and are not intended to limit the invention from that described in the claims. Well known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art. Details regarding control circuitry described herein are omitted, as such control circuits are within the skills of persons of ordinary skill in the relevant art.

Figure 1:
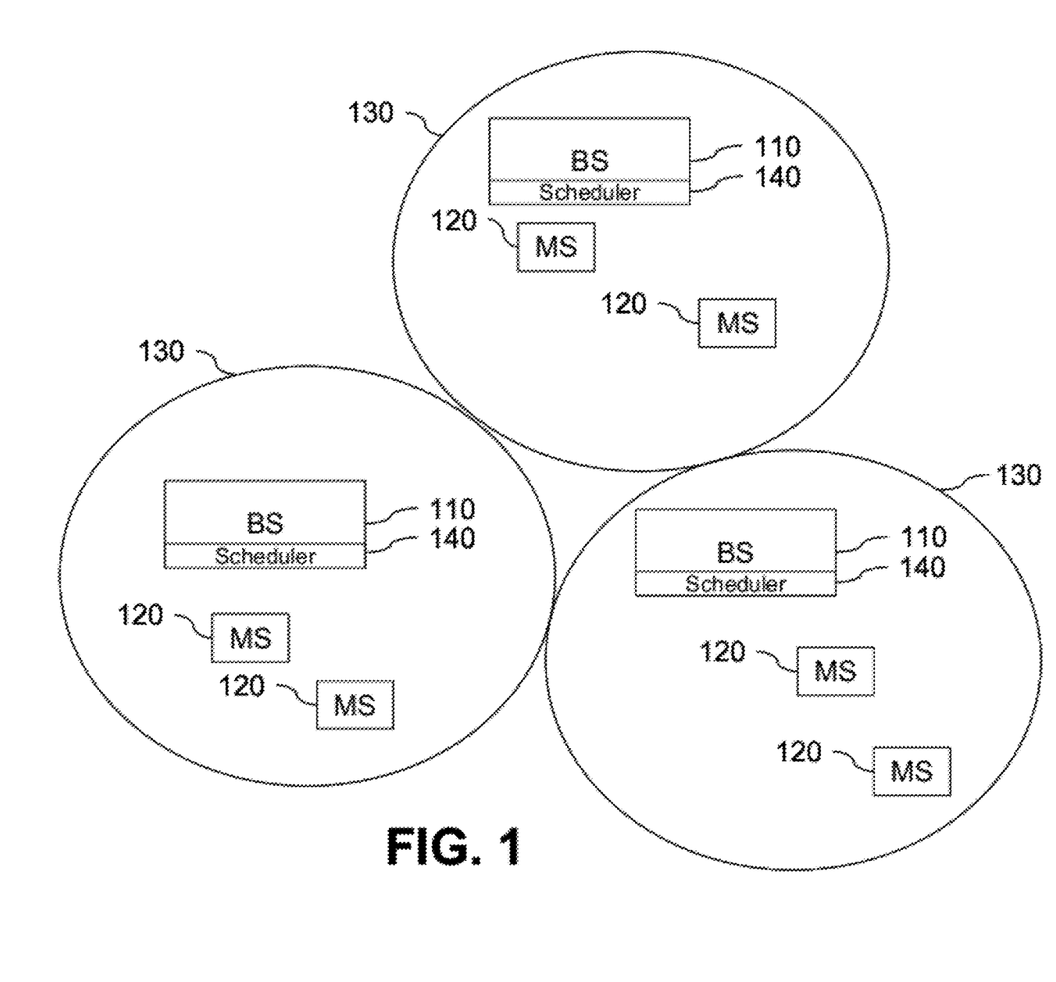
FIG. 1 illustrates a wireless communications network.

FIG. 1 is a wireless communications network comprising a plurality of base stations (BS) 110 providing voice and/or data wireless communication service to a plurality of mobile stations (MS) 120, also sometimes referred to as a subscriber unit, subscriber station, user equipment, and the like. The BS 110 is also sometimes referred to by other names such as access network (AN), access point (AP), Node-B, etc. Each BS 110 has a corresponding coverage area 130. Referring to FIG. 1, each BS 110 includes a scheduler 140 for allocating radio resources to the mobile stations. Exemplary wireless communication systems include, but are not limited to, Evolved Universal Terrestrial Radio Access (E-UTRA) networks, Ultra Mobile Broadband (UMB) networks, IEEE 802.16 networks, and other OFDMA based networks. In some embodiments, the network is based on a multiple access scheme other than OFDMA. For example, the network can be a frequency division multiplex access (FDMA) network wherein the time-frequency resources are divided into frequency intervals over a certain time interval, a time division multiplex access (TDMA) network wherein the time-frequency resources are divided into time intervals over a certain frequency interval, and a code division multiplex access (CDMA) network wherein the resources are divided into orthogonal or pseudo-orthogonal codes over a certain time-frequency interval.

Figure 2:
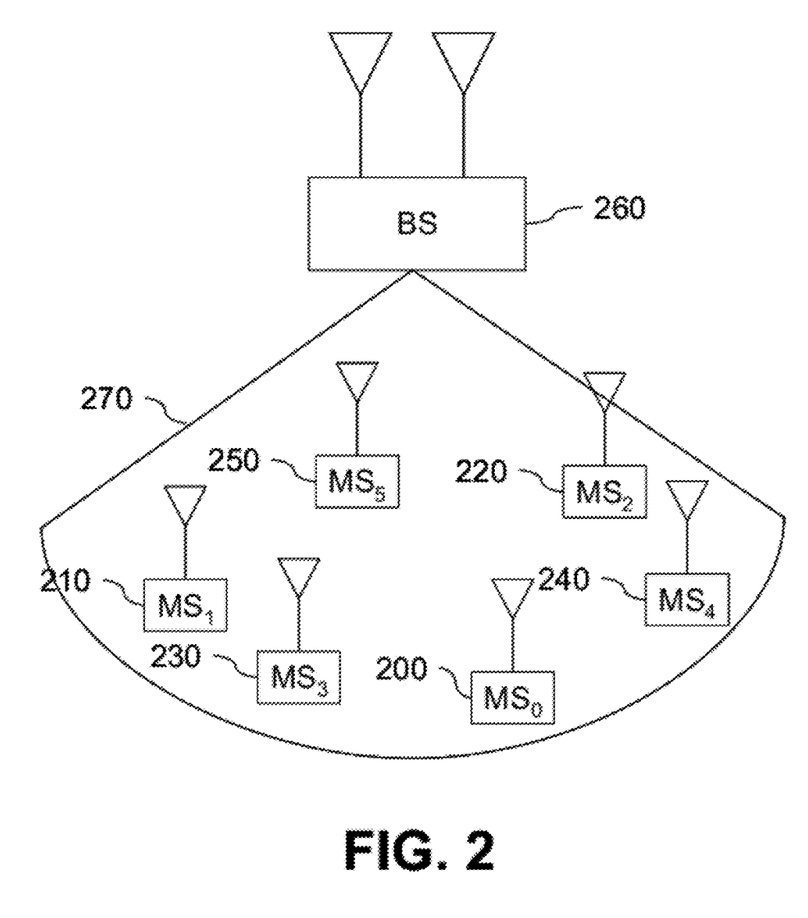
FIG. 2 illustrates a base station and several mobile stations from a wireless communications network.

FIG. 2 illustrates one base station and several mobile stations from the wireless communications network of FIG. 1. Exemplary base station 260 has three coverage areas, one of which is shown, coverage area 270. The coverage area 270 is sometime referred to as a sector. Six mobile stations 200, 210, 220, 230, 240, 250 are in the shown coverage area 270. Base station 260 typically assigns each mobile station one or more connection identifiers (CID) (or another similar identifier) to facilitate time-frequency resource assignment. The CID assignment can be transmitted from a base station to a mobile station on a control channel, can be permanently stored at the mobile station, or can be derived based on a mobile station or base station parameter.

Figure 3:
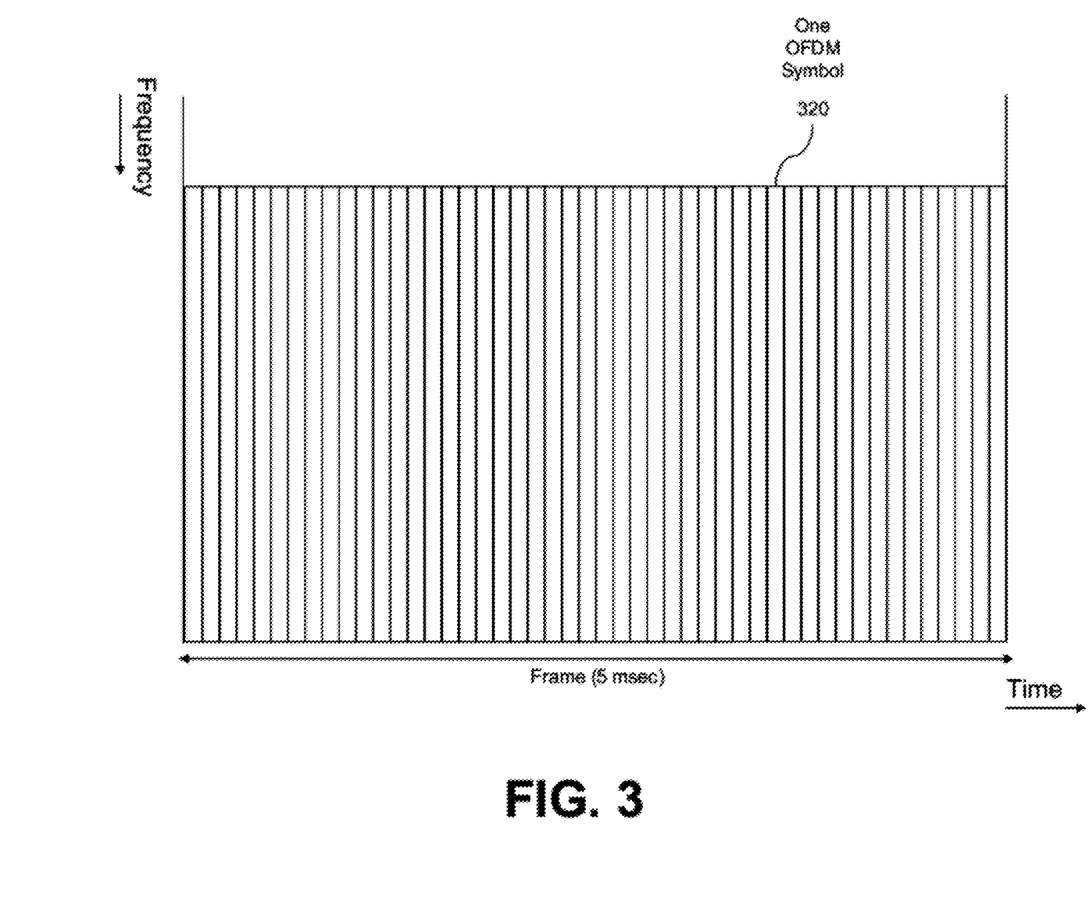
FIGS. 3 and 4 illustrate an example set of OFDMA time-frequency radio resources.

FIG. 3 illustrates an example set of OFDMA time-frequency radio resources. In OFDMA systems, the time-frequency resources are divided into OFDM symbols and OFDM subcarriers for allocation by the base station scheduler to the mobile stations. In an example OFDMA system, the OFDM subcarriers are approximately 10 kHz apart and the duration of each OFDM symbol is approximately 100 μsec. FIG. 3 illustrates one 5 msec frame of an OFDMA system, such as that defined by the IEEE 802.16e standard. Note that 5 msec is one frame duration and that other frame durations are possible. Referring again to FIG. 3, in this exemplary embodiment, resources in the time domain (x-axis) are divided into 48 OFDM symbols 320. In the frequency domain (y-axis), the resources are divided into multiple subchannels (not shown), wherein the size of the subchannel depends on the subcarrier permutation scheme. A subcarrier permutation scheme is a mapping from logical subchannels to physical subcarriers. Downlink (DL) partial usage of subcarriers (PUSC), DL full usage of subcarriers (FUSC), and uplink (UL) PUSC are exemplary subcarrier permutations schemes defined in the IEEE 802.16 standard. Other permutation schemes are also defined in the IEEE 802.16 standard, and in other standards as well, so DL PUSC, DL FUSC, and UL PUSC are merely used to illustrate the invention. For DL PUSC, in a 5 MHz bandwidth, there are 360 data subcarriers divided into 15 subchannels, wherein each subchannel has 24 data subcarriers. For DL PUSC, the base station must assign an even number of OFDM symbols for each subchannel. For DL FUSC, in a 5 MHz bandwidth, there are 384 data subcarriers divided into 8 subchannels, wherein each subchannel has 48 data subcarriers. For UL PUSC, in a 5 MHz bandwidth, there are 408 subcarriers (data plus pilot) divided into 17 subchannels, wherein each subchannel has 24 subcarriers (16 data plus 8 pilot). For UL PUSC, the number of OFDM symbols for each subchannel must be a multiple of 3. Note that the subchannels are a logical representation of the time-frequency resources of the system. Each logical time-frequency resource (subchannel) maps to a physical time-frequency resource. The mapping of logical time-frequency resources to physical time-frequency resources depends on which subcarrier permutation is being used. The mapping of logical time-frequency resources to physical time-frequency resources can change with time and can depend on one or more parameters defined by the system.

Figure 4:
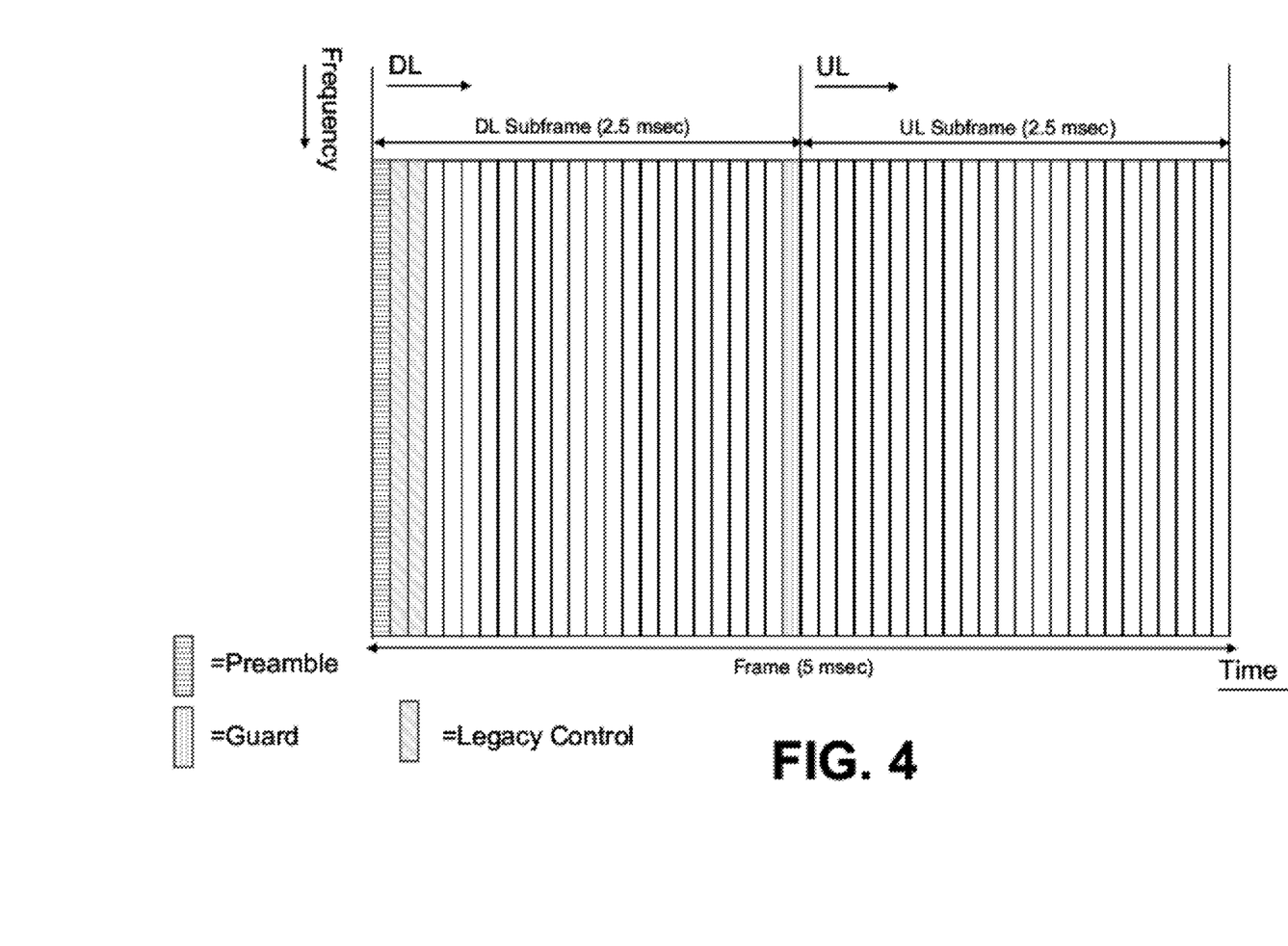

FIG. 4 illustrates an exemplary division of the time domain structure of FIG. 3 into a downlink subframe and an uplink subframe. Referring to FIG. 4, the time-frequency resources correspond to a time division duplex (TDD) system, such as that defined by the IEEE 802.16e standard. Note that this invention also applies to frequency division duplex (FDD) systems. In this exemplary embodiment, the resources in the time domain (x-axis) are divided into two equal portions, denoted as the DL subframe and the UL subframe. Each of the DL subframe and the UL subframe is comprised of 24 OFDM symbols. The first DL OFDM symbol is allocated for the preamble, which is used for timing and frequency synchronization by the mobile stations. The second and third DL OFDM symbols are used to transmit control information. The twenty-fourth DL OFDM symbol is allocated as a guard period. Note that there is also a guard period following the UL subframe, which is not shown.

Figure 5:
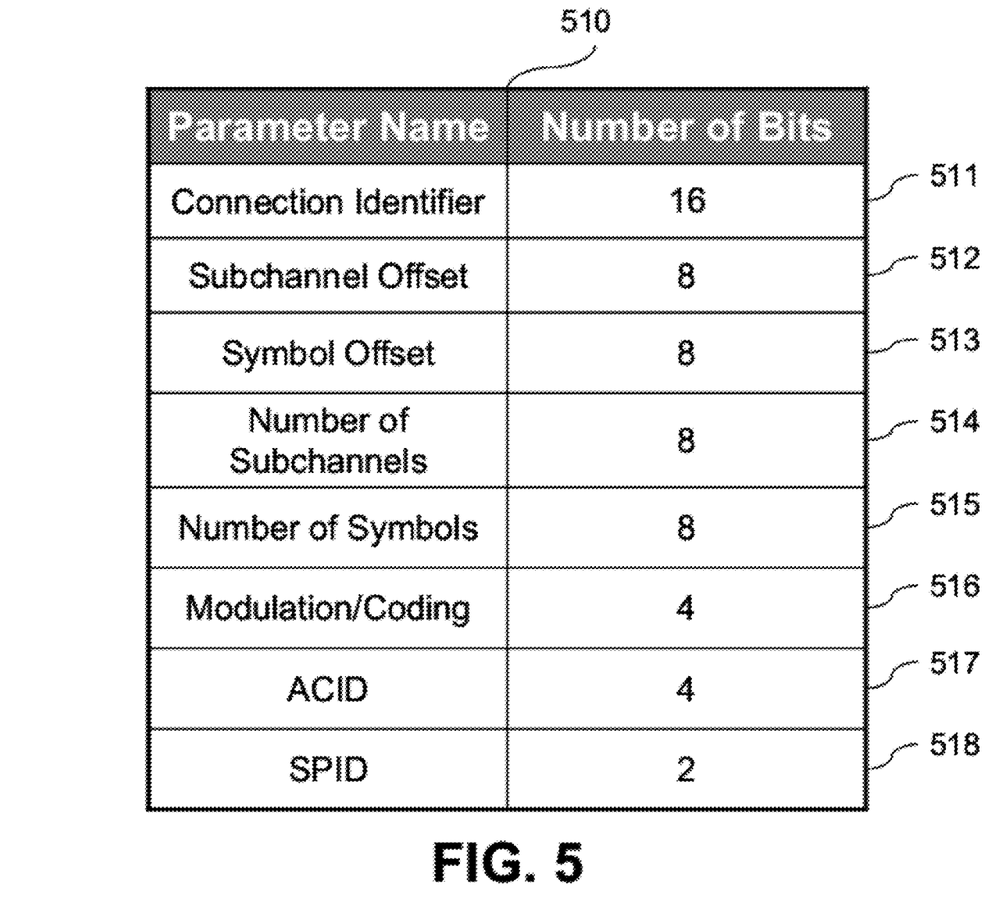
FIG. 5 illustrates an example assignment message.

FIG. 5 illustrates an example assignment message. The assignment message 510 contains several fields 511-518 and is used by the base station to inform the mobile station of its time-frequency resource assignment and the associated parameters. The assignment message 510 contains a 16-bit connection identifier field 511, where the connection identifier is used to identify the intended mobile station. The sub-channel offset field 512 is an 8-bit field used for indicating the beginning subchannel. The symbol offset field 513 is an 8-bit field for indicating the beginning OFDM symbol. The number of subchannels field 514 is an 8-bit field for indicating the number of subchannels in the allocation. The number of symbols field 515 is an 8-bit field for indicating the number of OFDM symbols in the allocation. The modulation/coding field 516 is a 4-bit field for indicating the modulation and coding of the packet. The ACID field 517 is a 4-bit field for indicating the ACID of the associated packet. At the receiver (base station or mobile station), the processor combines information for transmissions having the same ACID. For example, the receiver can combine soft values for transmissions having the same ACID prior to turbo decoding. The sub-packet identifier (SPID) field 518 is a 2-bit field for indicating the particular sub-packet from the H-ARQ process. For example, if four H-ARQ sub-packets are defined, the SPID value can be 0, 1, 2, or 3. Based on this information, the receiver knows how to combine sub-packets together prior to decoding. The number of bits for each field can change depending on the system and the associated parameters. Further, additional fields may be needed in some embodiments and fewer fields may be needed in some embodiments. In some embodiments, the time-frequency resource assignments for the Nth mobile station depend on the number of time-frequency resources assigned to mobile stations 1, 2, ... N−1. In these embodiments, the base stations only need to signal the number of time-frequency resources assigned to each mobile station.

Figure 6:
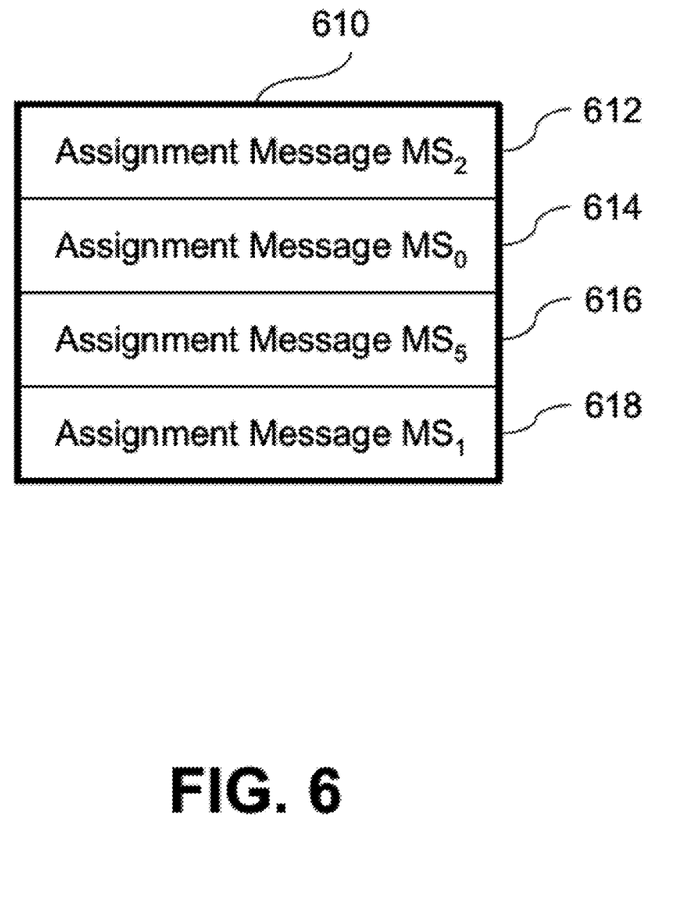
FIG. 6 illustrates an example control channel containing a list of assignment messages.

FIG. 6 illustrates an exemplary control channel containing a list of assignment messages. The base station transmits multiple assignment messages, such as the assignment message 510 of FIG. 5, to the intended mobile stations. One or more of the multiple assignment messages can be concatenated prior to encoding or the assignment messages can be transmitted separately. In FIG. 6, the base station concatenates four assignment messages 610 for transmission on one control channel. Considering again the 6 mobile stations of FIG. 2, arranged as depicted in FIG. 2, the base stations transmit assignment messages to MS2 612, MS0 614, MS5 616, and MS1 618. Based on the information in the assignment messages, the mobile stations can determine their time-frequency resource assignments and the associated parameters.

Figure 7:
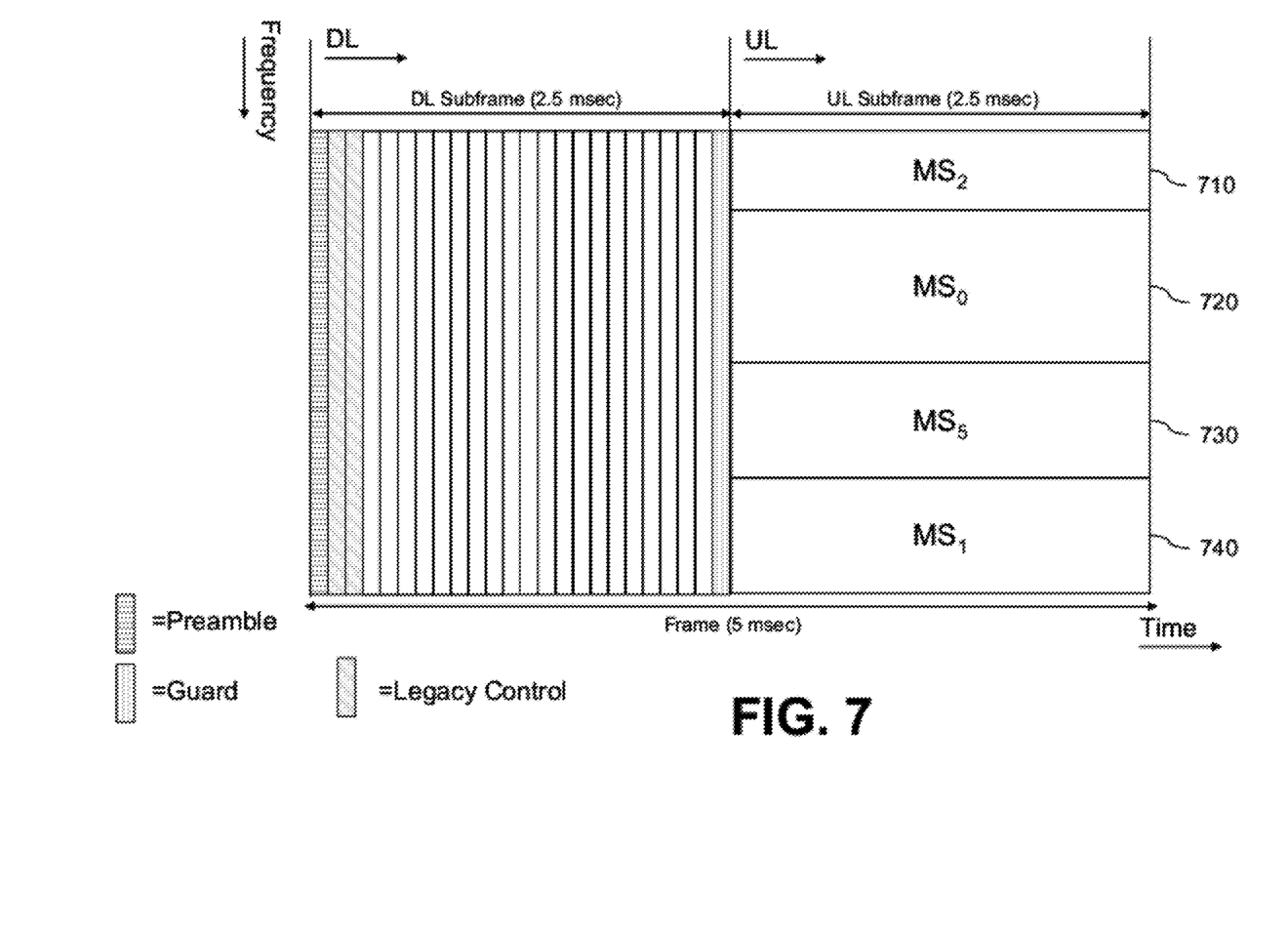
FIG. 7 illustrates example assignments.

FIG. 7 illustrates exemplary assignments for the assignment message of FIG. 6. Referring to FIG. 6, consider the UL-PUSC subcarrier permutation in which there are 17 subchannels. In one example, the base station assigns three subchannels to MS2 710, six subchannels to MS0 720, and four subchannels to each of MS5 730 and MS1 740, as depicted in FIG. 7. Based on the assignment of the logical subchannels as depicted in FIG. 7, the mobile stations transmit packets to the base station on the physical time-frequency resources corresponding to their assigned logical subchannels. The base station then receives the packets from the mobile stations and processes the packets to determine if it can successfully decode the packet.

Figure 8:
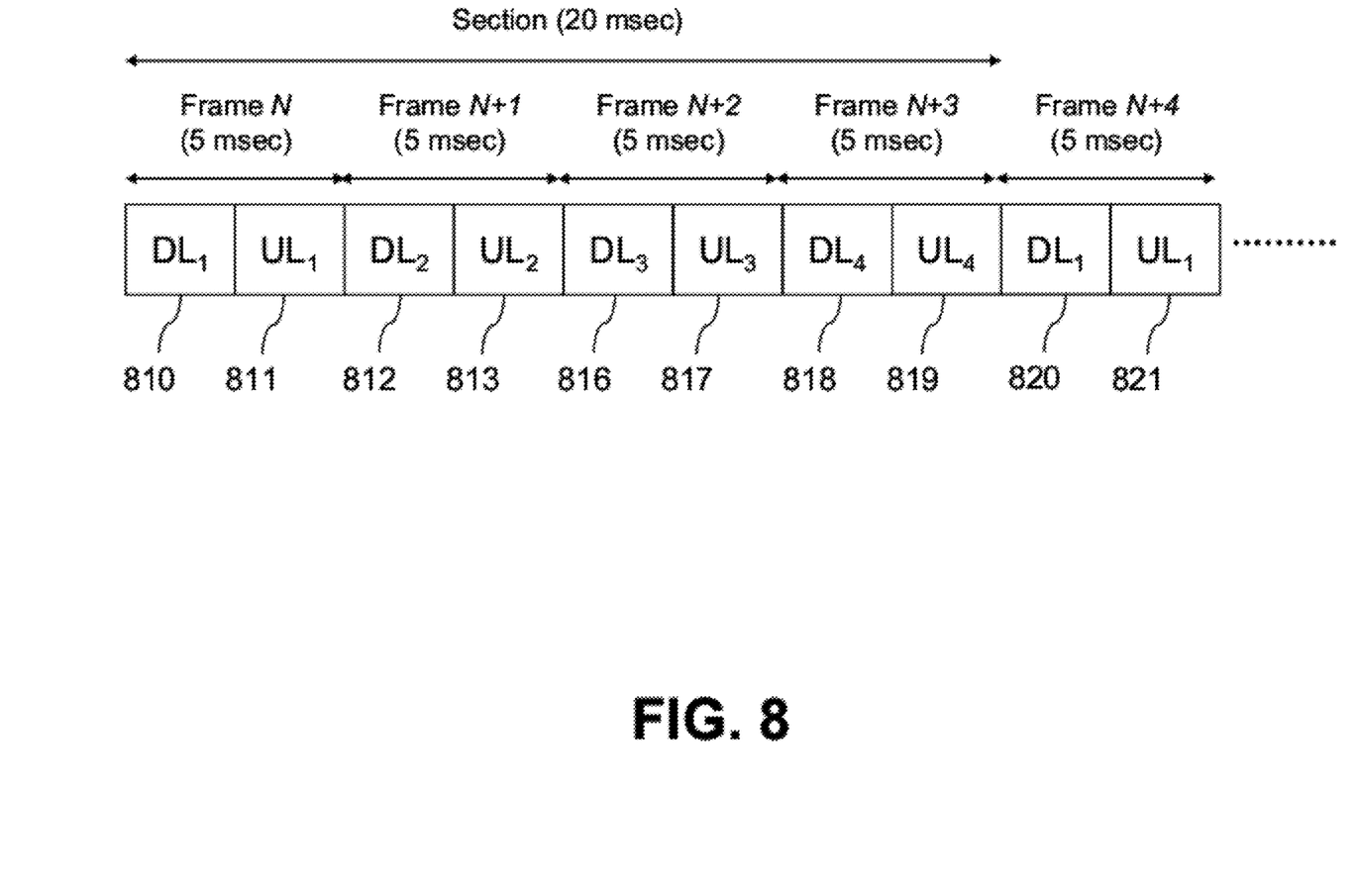
FIG. 8 illustrates a repeating sequence of frames.

FIG. 8 illustrates a repeating sequence of frames. Referring to FIG. 8, a frame is defined as 5 msec and contains both DL and UL subframes. A section is defined as 20 msec and contains four frames (four pairs of DL and UL subframes). First DL subframe 810 is denoted DL1, second DL subframe 812 is denoted DL2, third DL subframe 816 is denoted DL3, fourth DL subframe 818 is denoted DL4, and fifth DL subframe 820 is denoted DL1, indicating the pattern repeats every four frames. Similarly, first UL subframe 811 is denoted UL1, second UL subframe 813 is denoted UL2, third UL subframe 817 is denoted UL3, fourth UL subframe 819 is denoted UL4, and fifth UL subframe 821 is again denoted UL1, indicating the pattern repeats every four frames. In this example, the timing is tied to a section and repeats every 20 msec.

Figure 9:
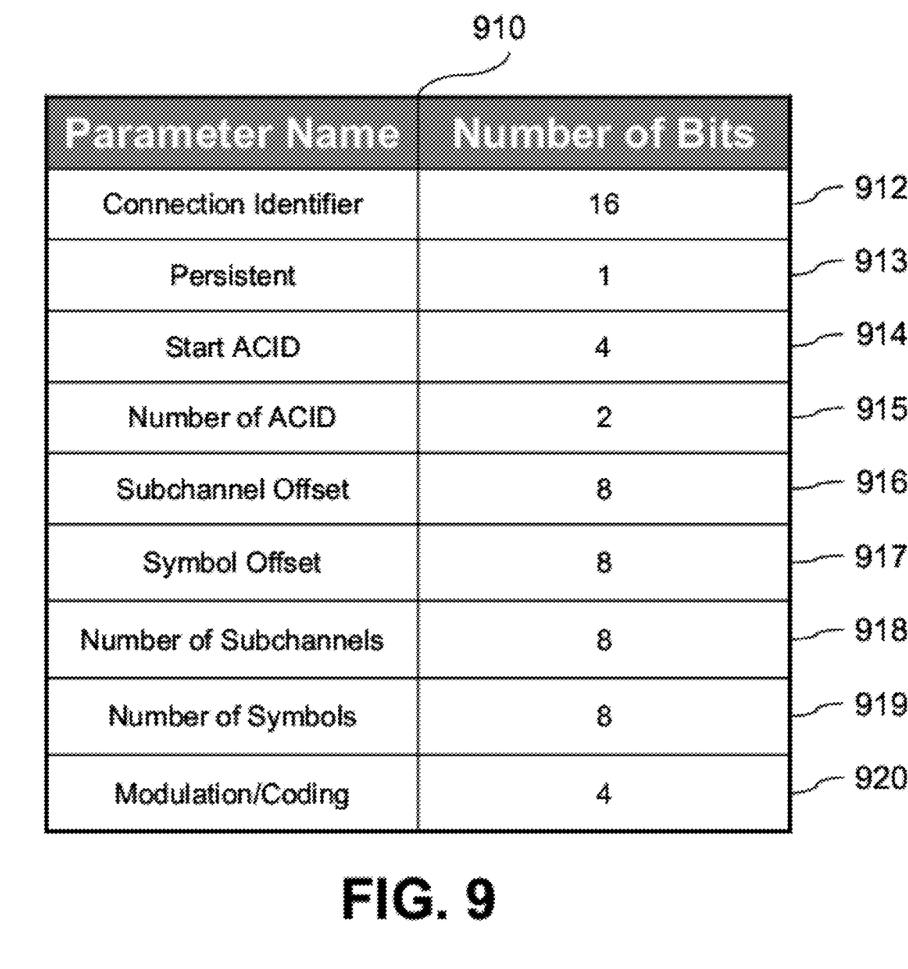
FIG. 9 illustrates an assignment message in accordance with one embodiment of the present invention.

It is known for a base station to make persistent assignments, whereby an assigned time-frequency resource is valid at periodic intervals. As used herein a non-persistent assignment is one that expires after each transmission. For example, a base station can assign an UL resource beginning in UL1 and repeating in UL3, UL1, etc. Similarly, the base station can assign an UL resource beginning in UL1 and repeating in UL2, UL3, UL4, UL1, etc. For persistent assignments, the assignment message is transmitted to the mobile station initially to indicate the assigned time-frequency resource, and then the base station uses the same time-frequency resource for subsequent transmissions to the mobile station. These transmissions can be hybrid automatic repeat request (H-ARQ) transmissions of the same packet, subsequent transmissions of different packets, or subsequent transmissions of a series of packets. The initially assigned time-frequency resource is maintained by the base station for the mobile station until a timer elapses, a voice over internet protocol (VoIP) talk-spurt is completed, a VoIP call is completed, a certain number of negative acknowledgements is determined by the base station, or until the resource is explicitly or implicitly de-assigned by the base station.

For VoIP traffic, the base station can assign UL resources beginning in UL1 and repeating in UL1. In this way, the mobile station can transmit the first H-ARQ transmission for each of a series of packets in each occurrence of UL1. For this case, subsequent transmissions will need to be assigned using a conventional control channel. When the base station uses a persistent assignment to assign a series of first transmission opportunities for a series of packets, there needs to be a way for associating each packet with an ACID, so that the base station and mobile station can keep track of which packet to transmit or receive. FIG. 9 provides an exemplary assignment message in accordance with one embodiment of the present invention. The assignment message 910 contains several fields 912-920, including persistent field 913, which is a 1-bit field used to indicate whether the assignment is persistent or non-persistent. Start ACID field 914 is preferably a 4-bit field used to indicate the starting ACID for a series of packets. Number of ACID field 915 is preferably a 2-bit field used to indicate a number of ACID fields associated with a persistent assignment. The ACID values repeat periodically according to the value of the number of ACID field 915. For example, if the start ACID is 7 and the number of ACID is 2, then the ACIDs corresponding to the persistent assignment follow the pattern 7, 8, 7, 8, etc. As another example, if the start ACID is 0, and the number of ACID is 4, then the ACIDs corresponding to the persistent assignment follow the pattern 0, 1, 2, 3, 0, 1, 2, 3. For some persistent assignments, the number of ACID can be 1, indicating that the same ACID is used for each packet in the series of packets.

Figure 10:
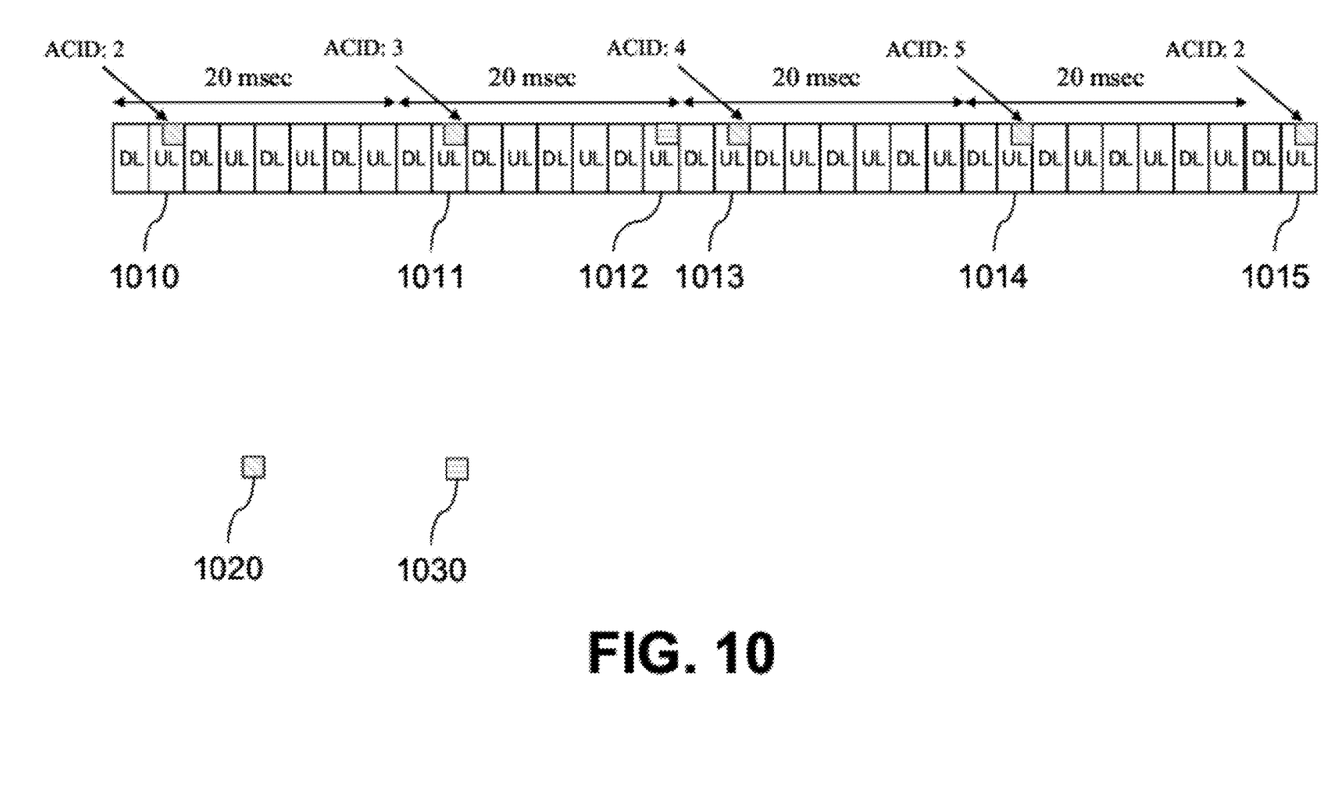
FIG. 10 illustrates the association of ACID values with packets.

FIG. 10 is provided to illustrate how the assignment message of FIG. 9 can be used to indicate an ACID for a series of packets. Referring to FIG. 10, consider that the base station assigns to a particular mobile station a persistent resource with a period of 20 msec, beginning in the UL sub-frame labeled 1010. The time-frequency resource assigned to the mobile station is labeled as 1020. Further consider that the base station assigns to the mobile station a starting ACID of 2 and the number of ACID as 4. In this case, the ACID pattern is 2, 3, 4, 5, 2, 3, 4, 5. As labeled in FIG. 10, time-frequency resource 1020 repeats in UL sub-frames 1011, 1013, 1014, 1015, and so on, with the ACID as shown in FIG. 10. Consider that the mobile station transmits transmission 1 of packet 1 in 1010, and transmission 1 of packet 2 in 1011. Consider the case where the base station was not able to correctly decode either packet. The base station then assigns the mobile station a non-persistent assignment of a time-frequency resource 1030 in UL sub-frame 1012. Using the ACID association established by the persistent assignment message 910 (FIG. 9), the base station is able to indicate an ACID to the mobile station. In this example, the base station indicates that this assignment is for ACID:3 using the assignment message. The mobile station then knows that this assignment is for ACID:3 and can therefore transmit the correct packet to the base station using the appropriate assigned time-frequency resources.

Figure 11:
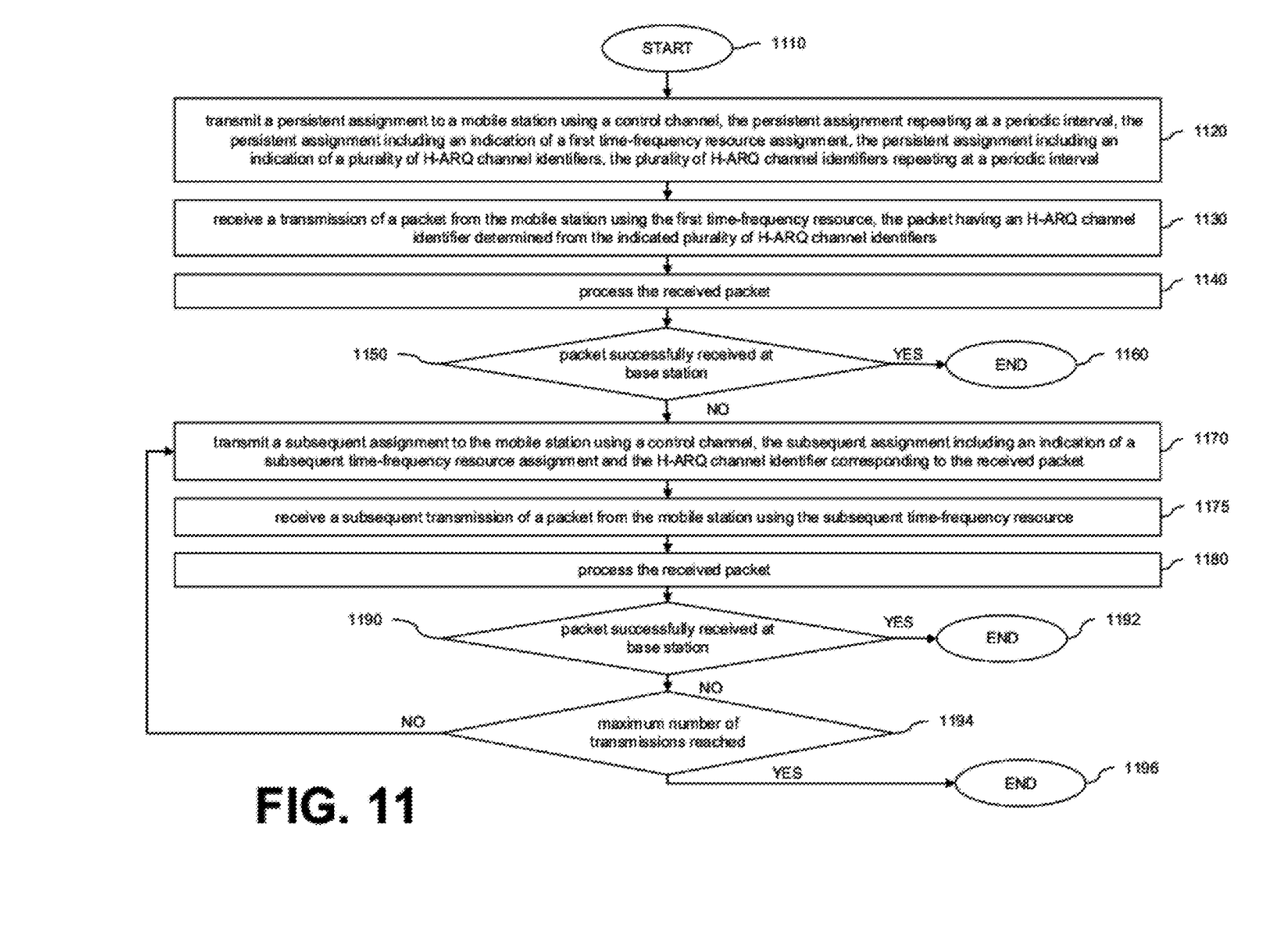
FIG. 11 is a flow chart for base station operation in accordance with one embodiment of the present invention.

FIG. 11 is a flow chart for base station operation in accordance with one embodiment of the present invention. At step 1110, the process begins. At step 1120, the base station transmits a persistent assignment to a mobile station using a control channel, the persistent assignment repeating at a periodic interval, the persistent assignment including an indication of a first time-frequency resource assignment, the persistent assignment including an indication of a plurality of H-ARQ channel identifiers, the plurality of H-ARQ channel identifiers repeating at a periodic interval. At step 1130, the base station receives a transmission of a packet from the mobile station using the first time-frequency resource, the packet having an H-ARQ channel identifier determined from the indicated plurality of H-ARQ channel identifiers. At step 1140, the base station processes the received packet. At step 1150, if the packet is successfully received at the base station, the process ends at step 1160. If the packet is not successfully received, the process continues to step 1170 where the base station transmits a subsequent assignment to the mobile station using a control channel, the subsequent assignment including an indication of a subsequent time-frequency resource assignment and the H-ARQ channel identifier corresponding to the received packet. At step 1175, the base station receives a subsequent transmission of a packet from the mobile station using the subsequent time-frequency resource. At step 1180, the base station processes the received packet. At step 1190, if the packet is successfully received at the base station, the process ends at step 1192. If the packet is not successfully received, the process continues to step 1194, where the base station determines if the maximum number of transmissions is reached. If yes, the process ends at step 1196. If no, the process returns to step 1170.

Figure 12:
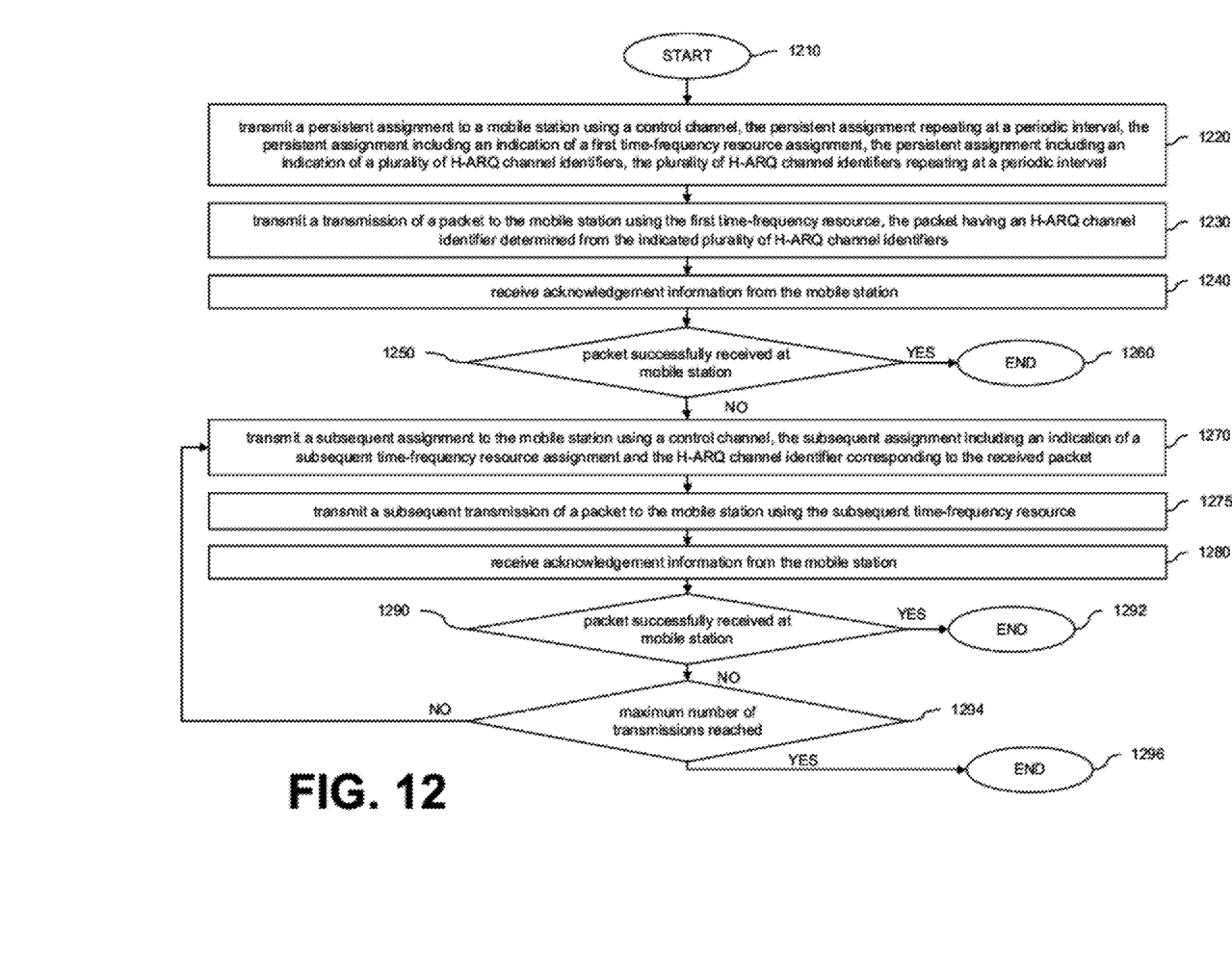
FIG. 12 is a flow chart for base station operation in accordance with one embodiment of the present invention.

FIG. 12 is a flow chart for base station operation in accordance with one embodiment of the present invention. At step 1210, the process begins. At step 1220, the base station transmits a persistent assignment to a mobile station using a control channel, the persistent assignment repeating at a periodic interval, the persistent assignment including an indication of a first time-frequency resource assignment, the persistent assignment including an indication of a plurality of H-ARQ channel identifiers, the plurality of H-ARQ channel identifiers repeating at a periodic interval. At step 1230, the base station transmits a transmission of a packet to the mobile station using the first time-frequency resource, the packet having an H-ARQ channel identifier determined from the indicated plurality of H-ARQ channel identifiers. At step 1240, the base station receives acknowledgement information from the mobile station. At step 1250, if the packet is successfully received at the mobile station (if an ACK is received), the process ends at step 1260. If the packet is not successfully received, the process continues to step 1270 where the base station transmits a subsequent assignment to the mobile station using a control channel, the subsequent assignment including an indication of a subsequent time-frequency resource assignment and the H-ARQ channel identifier corresponding to the received packet. At step 1275, the base station transmits a subsequent transmission of a packet to the mobile station using the subsequent time-frequency resource. At step 1280, the base station receives acknowledgement information from the mobile station. At step 1290, if the packet is successfully received at the mobile station, the process ends at step 1292. If the packet is not successfully received, the flow chart continues to step 1294, where the base station determines if the maximum number of transmissions is reached. If yes, the process ends at step 1296. If no, the process returns to step 1270.

Figure 13:
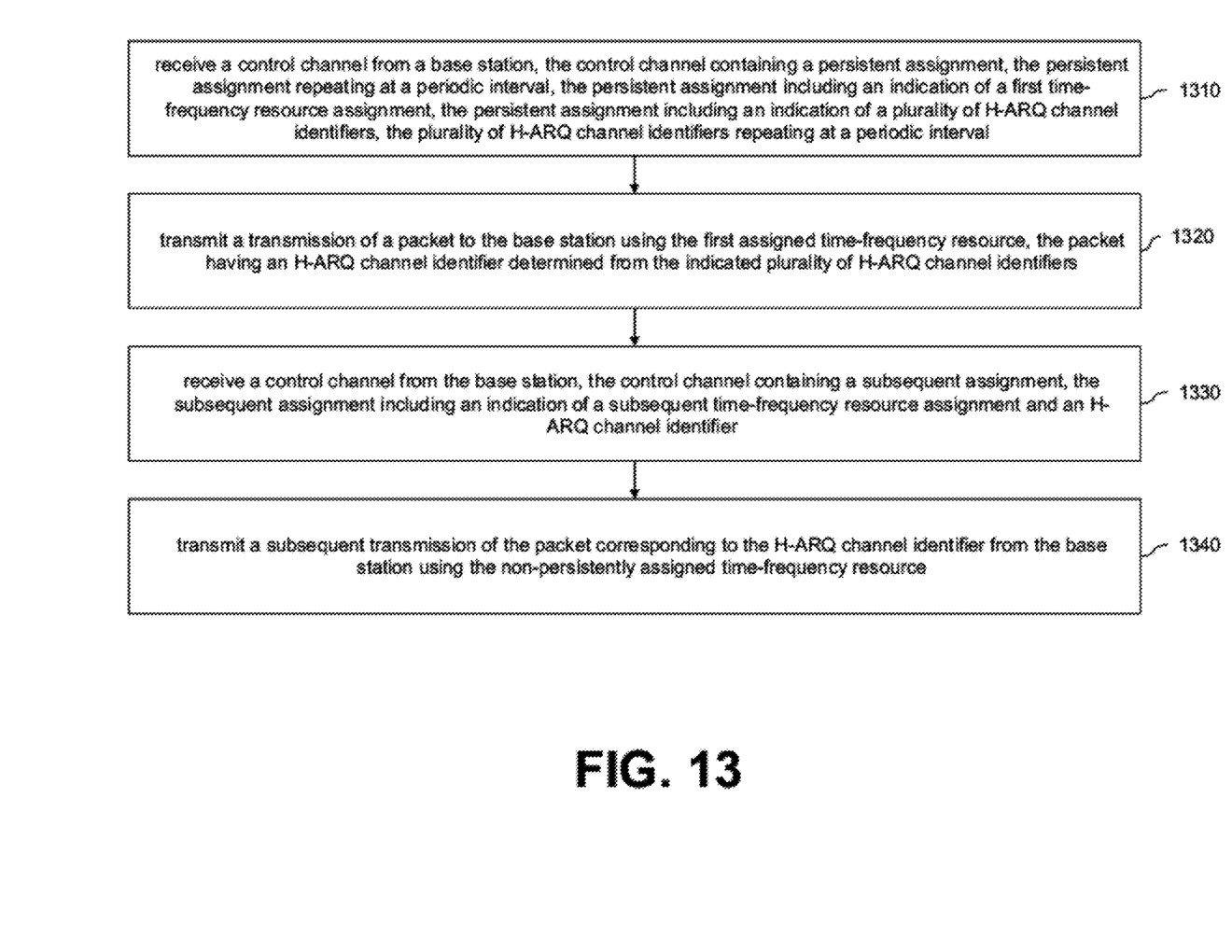
FIG. 13 is a flow chart for mobile station operation in accordance with one embodiment of the present invention.

FIG. 13 is a flow chart for mobile station operation in accordance with one embodiment of the present invention. At step 1310, the mobile station receives a control channel from a base station, the control channel containing a persistent assignment, the persistent assignment repeating at a periodic interval, the persistent assignment including an indication of a first time-frequency resource assignment, the persistent assignment including an indication of a plurality of H-ARQ channel identifiers, the plurality of H-ARQ channel identifiers repeating at a periodic interval. At step 1320, the mobile station transmits a transmission of a packet to the base station using the first assigned time-frequency resource, the packet having an H-ARQ channel identifier determined from the indicated plurality of H-ARQ channel identifiers. At step 1330, the mobile station receives a control channel from the base station, the control channel containing a subsequent assignment, the subsequent assignment including an indication of a subsequent time-frequency resource assignment and an H-ARQ channel identifier. At step 1340, the mobile station transmits a subsequent transmission of the packet corresponding to the H-ARQ channel identifier from the base station using the subsequent time-frequency resource.

Figure 14:
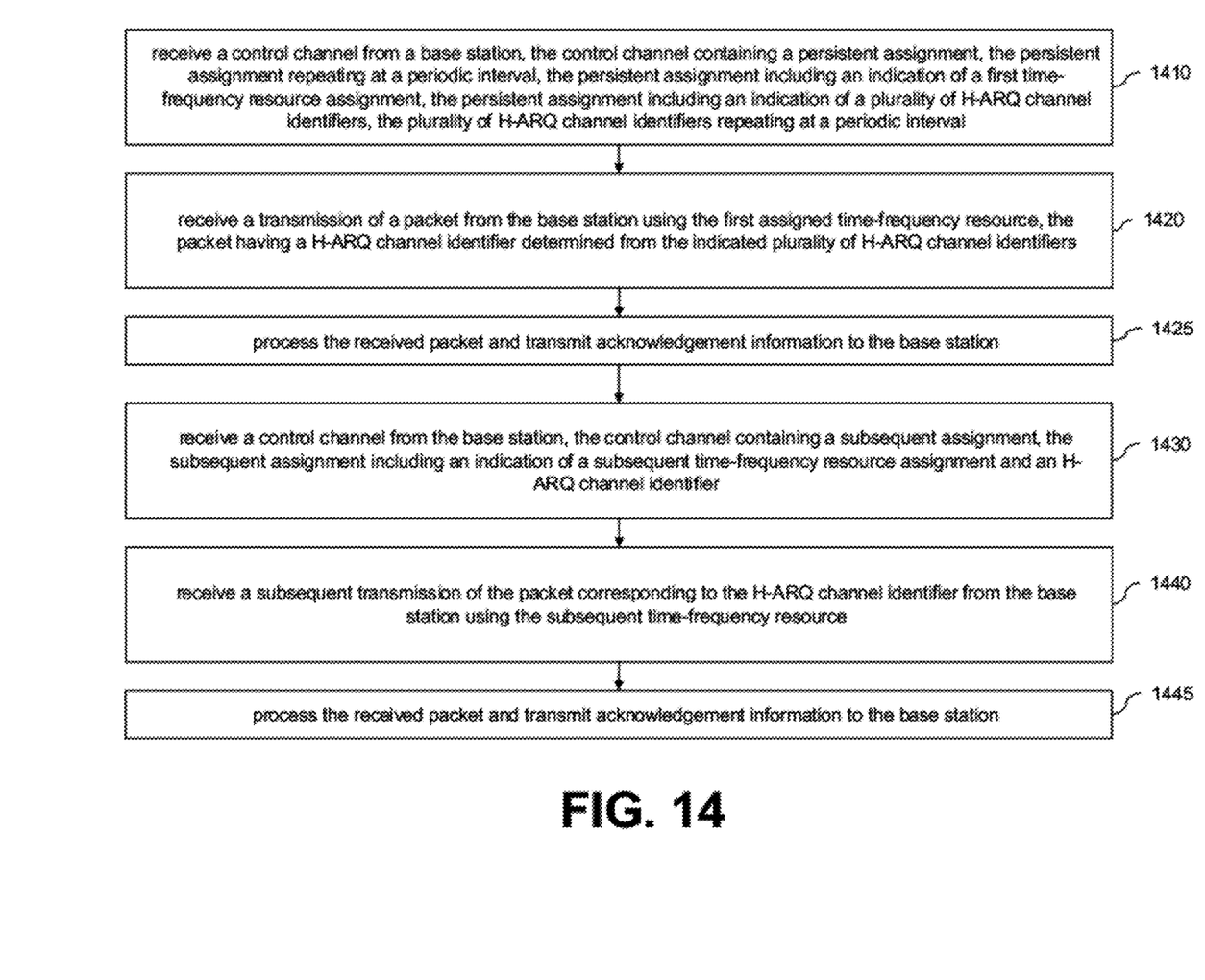
FIG. 14 is a flow chart for mobile station operation in accordance with one embodiment of the present invention.

FIG. 14 is a flow chart for mobile station operation in accordance with one embodiment of the present invention. At step 1410, the mobile station receives a control channel from a base station, the control channel containing a persistent assignment, the persistent assignment repeating at a periodic interval, the persistent assignment including an indication of a first time-frequency resource assignment, the persistent assignment including an indication of a plurality of H-ARQ channel identifiers, the plurality of H-ARQ channel identifiers repeating at a periodic interval. At step 1420, the mobile station receives a transmission of a packet from the base station using the first assigned time-frequency resource, the packet having an H-ARQ channel identifier determined from the indicated plurality of H-ARQ channel identifiers. At step 1425, the mobile station processes the received packet and transmits acknowledgement information to the base station. At step 1430, the mobile station receives a control channel from the base station, the control channel containing a subsequent assignment, the subsequent assignment including an indication of a subsequent time-frequency resource assignment and an H-ARQ channel identifier. At step 1440, the mobile station receives a subsequent transmission of the packet corresponding to the H-ARQ channel identifier from the base station using the subsequent time-frequency resource. At step 1445, the mobile station processes the received packet and transmits acknowledgement information to the base station.

What is claimed is:

1. A base station, comprising:
   a transmitter operable to transmit a persistent assignment to a mobile station, the persistent assignment including an indication of a time-frequency resource assignment for the mobile station and being associated with a plurality of hybrid automatic repeat request (H-ARQ) channel identifiers (ACIDs); and
   wherein the resource assignment repeats at a first periodic interval, and each of the plurality of ACIDs repeats at a second periodic interval;
   wherein the persistent assignment comprises a Start ACID field and a Number of ACID field, the Start ACID field indicating the starting ACID for a series of packets, and the Number of ACID field indicates the number of ACIDs associated with the persistent assignment; and
   wherein an ACID value increments after the first periodic interval, each of the ACID values repeating after the second periodic interval, the second periodic interval being determined at least in part on the value of the Number of ACID field.

2. The base station of claim 1, further configured to:
   establish a control channel communication between the base station and the mobile station, said control channel being operable to transmit the persistent assignment to the mobile station.

3. The base station of claim 1, further configured to:
   receive at the base station a transmission of a packet from the mobile station using the time-frequency resource assignment, the packet being associated with an ACID determined from the plurality of ACIDs.

4. The base station of claim 3, further configured to:
   process the received packet;
   transmit a subsequent assignment to the mobile station, the subsequent assignment including an indication of a subsequent time-frequency resource assignment and an ACID corresponding to the received packet; and
   receive a subsequent transmission of a subsequent packet from the mobile station using the subsequent time-frequency resource assignment.

5. The base station of claim 4 further configured to:
   determine if the packet has been successfully received at the base station;
   determine if the maximum number of transmissions is reached when the packet is not successfully received at the base station; and
   repeat the process of transmitting a subsequent assignment to the mobile station, if the maximum number of transmissions is not reached.

6. The base station of claim 1, wherein the ACID value increments 1 after the first periodic interval.

7. A method in a base station of communicating a packet with a mobile station, the method comprising:
   transmitting a persistent assignment to a mobile station, the persistent assignment including an indication of a time-frequency resource assignment for the mobile station and being associated with a plurality of hybrid automatic repeat request (H-ARQ) channel identifiers (ACID); and
   wherein the resource assignment repeats at a first periodic interval, each of the plurality of ACIDs repeating at a second periodic interval;
   wherein the persistent assignment comprises a Start ACID field and a Number of ACID field, the Start ACID field providing an indication of the starting ACID for a series of packets, and the Number of ACID field indicating the number of ACIDs associated with the persistent assignment; and
   wherein an ACID value increments after the first periodic interval, each of the ACID values repeating after the second periodic interval, and the second periodic interval being determined at least in part on the value of the Number of ACID field.

8. The method of claim 7, further comprising:
   establishing a control channel between the base station and the mobile station;
   and transmitting the persistent assignment over the control channel to the mobile station.

9. The method of claim 7, further comprising:
   transmitting a first packet to the mobile station using the time-frequency resource assignment, the first packet being associated with an ACID determined from the associated plurality of ACIDs; and
   receiving acknowledgement information from the mobile station.

10. The method of claim 9 further comprising:
    transmitting a subsequent assignment to the mobile station, the subsequent assignment including an indication of a subsequent time-frequency resource assignment and an ACID corresponding to the first packet;
    transmitting a subsequent packet to the mobile station using the subsequent time-frequency resource assignment; and
    receiving acknowledgement information relating to the subsequent packet from the mobile station.

11. The method of claim 1, wherein the ACID value increments 1 after the first periodic interval.

12. The method of claim 10, the method further comprising determining when the first packet is not successfully received at the mobile station prior to transmitting a subsequent assignment.

* * * * *